US005992721A

United States Patent [19]
Craft et al.

[11] Patent Number: 5,992,721
[45] Date of Patent: Nov. 30, 1999

[54] RODLESS CYLINDER ROPE TENSIONING APPARATUS

[75] Inventors: Michael E. Craft, Dubach; Douglas M. Craft, Ruston, both of La.; Paul E. Mayfield, Dallas, Tex.

[73] Assignee: MEC Enterprises, Inc., Dubach, La.

[21] Appl. No.: 09/002,551

[22] Filed: Jan. 2, 1998

Related U.S. Application Data

[60] Provisional application No. 60/034,537, Jan. 6, 1997, abandoned.

[51] Int. Cl.[6] .......... G03B 1/56; F16D 31/02; F15B 11/08; F01B 29/00

[52] U.S. Cl. .......... 226/91; 60/429; 91/442; 91/451; 92/88; 226/118.2

[58] Field of Search .......... 226/91, 92, 118.2, 226/172; 92/88, 137; 254/387; 242/417.1; 91/442, 451; 60/429, 461; 198/813, 817; 162/255; 474/104

[56] References Cited

U.S. PATENT DOCUMENTS

| | | | |
|---|---|---|---|
| 1,826,103 | 10/1931 | Trempe . | |
| 1,884,277 | 10/1932 | Sassen | 60/429 |
| 2,986,267 | 5/1961 | Carlson et al. | 198/813 X |
| 3,643,497 | 2/1972 | LeCompte . | |
| 4,215,720 | 8/1980 | Becker | 91/451 X |
| 4,282,898 | 8/1981 | Harmon et al. | 91/451 X |
| 4,288,014 | 9/1981 | Evers | 226/44 |
| 4,417,502 | 11/1983 | Shore | 91/451 X |
| 4,487,018 | 12/1984 | Budzich | 91/451 X |
| 5,067,608 | 11/1991 | McLellan | 198/813 X |
| 5,263,623 | 11/1993 | Bracken | 226/92 |
| 5,347,914 | 9/1994 | Kinoshita et al. | 92/88 |
| 5,375,753 | 12/1994 | Barthauer et al. | 226/92 |
| 5,377,892 | 1/1995 | Kimball | 226/92 |
| 5,413,264 | 5/1995 | Kotzur et al. . | |
| 5,482,266 | 1/1996 | Takemoto . | |

*Primary Examiner*—Michael R. Mansen
*Attorney, Agent, or Firm*—John M Harrison

[57] ABSTRACT

A rodless cylinder rope tensioning apparatus maintains tension in an endless rope system operable for threading a web in a paper-making apparatus and includes at least one rodless cylinder having at least one yoke sheave attached to the internal piston in the rodless cylinder. A rope is stretched around an entry guide roller and the yoke sheave and is stretched by operation of the rodless cylinder, which selectively causes the piston to relocate the yoke sheave along the length of the rodless cylinder and apply a selected degree of tension to the rope. In a preferred embodiment a pair of entry guide rollers is provided in a frame containing a pair of parallel rodless cylinders, each having a yoke sheave independently movable along the respective rodless cylinder by operation of the corresponding rodless cylinder piston, to effect tensioning of a pair of ropes in the paper-making apparatus. Various air-operated control devices are provided to effect the desired "thread" and "run" operations of the rodless cylinder rope tensioning apparatus.

16 Claims, 8 Drawing Sheets

RODLESS CYLINDER ROPE TENSIONING APPARATUS

CROSS-REFERENCE TO RELATED APPLICATIONS

This application claims the benefit of copending U.S. Provisional Application Ser. No. 60/034,537, filed Jan. 6, 1997, now abandoned.

BACKGROUND OF THE INVENTION

1. Field of the Invention

This invention relates to tensioning apparatus for tensioning one or more ropes in a paper-making apparatus to facilitate threading a paper web through the paper-making apparatus. In order to locate a web of paper in proper position for processing through a paper-making apparatus, a web or sheet of paper is directed by means of one or a pair of endless ropes around multiple rolls located in the paper-making apparatus for processing the web into rolled paper. Although a single rope may be used in certain applications of the paper-making machine, it is more common to use a pair of parallel ropes, each carrying the paper web. The rope typically has a diameter of about one-half inch and is usually constructed of nylon, sisal or other natural fibers having sufficient strength to maintain a desired structural integrity as the rope or ropes traverse the multiple rollers in the paper-making apparatus. Because of the nature of operation of the paper-making apparatus and the construction of the ropes, the ropes stretch during operation, typically from about seven percent to about ten percent of their original length and each rope may be from approximately two hundred to about four hundred feet in length, thereby providing a significant problem of stretch over a period of time as the rope is used to support the paper web in the paper-making apparatus.

2. Description of the Prior Art

Various types of rope tensioning apparatus have been tilized in the prior art to stretch one or more ropes used in supporting a paper web in a paper-making apparatus and in similar equipment requiring the tensioning of ropes or cables. Typical of these patents is U.S. Pat. No. 1,826,103, dated Oct. 6, 1931, to W. J. Trempe. The Trempe automatic compensator for traveling felt in paper-making machines includes an automatic compensator which maintains relatively constant tension in a traveling felt of variable length. The automatic compensator includes a pair of tracks, a sheave having a groove in the periphery thereof guided on the tracks, a shaft upon which the sheave is rotatably mounted and a roller over which the felt is guided, the roller being mounted on the shaft and the automatic compensator designed to automatically vary the position of the sheave to maintain substantially constant felt tension. U.S. Pat. No. 3,643,497, dated Feb. 22, 1972, to George W. Lecompte details a "Tensile Loading Apparatus For Moving Wire". The apparatus is designed to test the tensile strength of moving wire and includes a main pulley having a pair of grooves and a free pulley biased away from the main pulley for leading wire in a loop from one main pulley groove to the other. Guides for guiding the wire to and away from the main pulley assure a 180-degree wire wrap about each main pulley groove. This wrap facilitates a high testing tension in the loop that extends about the free pulley, while only a low tension exists prior to entering on the main pulley and after leaving it. A "Dancer Roll Assembly" is detailed in U.S. Pat. No. 4,288,014, dated Sep. 8, 1981, to Jack Par Evers. The patent details a pair of dancer roll assemblies disposed in side-by-side relationship, each including an upper shaft and a lower shaft having spaced sprockets which are vertically aligned. The assemblies receive a pair of belts which carry a dancer doll for vertical movement under the influence of a tensioned web passed around the dancer row. The upper shaft is a control shaft and is connected to a pneumatic control motor which resists the rotation of the shaft and thus, the upward movement of the dancer roll. The tension on the web is controlled by controlling the air pressure in the pneumatic control motor. U.S. Pat. No. 5,375,753, dated Dec. 27, 1994, to Thomas E. Barthauer et al, details a "Tensioning Apparatus For Web Threading Endless Rope". The rope stretcher is designed for use in a paper-making machine and includes a beam having parallel flanges forming tracks which are engaged by guide wheels supporting separate carriages. The carriages support corresponding rope sheaves for free rotation and a pair of fluid cylinders are mounted on the beam and have piston rods connected directly to the corresponding carriages. The rope sheave on each carriage has at least two peripheral grooves to receive a double loop of the rope and the frame supports a corresponding multiple groove sheave for each of the carriage sheaves and for also receiving a double loop of the rope. U.S. Pat. No. 5,377,892, dated Jan. 3, 1995, to Charles D. Kimball, discloses a fluid pressure tensioning apparatus for a web threading endless rope. The device includes a beam having a flange forming a track which is engaged by guide wheels supporting a pair of separate carriages. The carriages support corresponding rope shields for free rotation and a pair of fluid cylinders are mounted on the beam and enclose pistons connected by a corresponding piston rod directly to the corresponding carriages. Operation of the fluid cylinders by a suitable fluid tension the rope sheaves after the tensioning apparatus is installed in a paper-making machine. A serial accumulating system for filamentary material is detailed in U.S. Pat. No. 5,413,264, dated May 9, 1995, to Frank W. Kotzur et al. The winding accumulator system is designed for controlling the storage of filamentary material between a source of material and a winding receptacle and includes multiple, serially interconnected accumulator units for storing the filamentary material. The movement of the filamentary material is varied between the accumulator units and the movement varying device to limit the change in tension of the filamentary material with changes in acceleration or deceleration of the filamentary material caused by a change in the input or output of filamentary material to or from the accumulator system. U.S. Pat. No. 5,482,266, dated Jan. 9, 1996, to Takemoto et al, details a "Paper Conveying Apparatus Having A Belt Tension Adjusting Mechanism". The belt tensioning adjusting mechanism detailed in the patent includes a belt tension adjusting pulley, over which the endless belt is placed; a plate having multiple recesses, in which a rotary shaft of the belt tensioning adjusting pulley is received; a handle having a pin provided at one end, which pin engages the recess; and a linking member connected at one end with the rotary shaft of the belt tension adjusting pulley and connected at the other end thereof with an intermediate portion of the handle.

It is an object of this invention to provide a new and improved tensioning apparatus for tensioning one or more ropes carrying a paper web in a paper-making apparatus or machine, which tensioning apparatus utilizes one or more rodless cylinders and at least one cooperating pair of sheaves, one of which sheaves in each cooperating pair is connected to the piston in the rodless cylinder for tensioning or reducing tension on the rope or ropes.

Another object of this invention is to provide a new and improved rodless cylinder rope tensioning apparatus for tensioning one or more ropes that carry a paper web in a paper-making apparatus, which apparatus is characterized in a preferred embodiment by at least one rodless cylinder fitted with a freely rotating guide sheave and a tensioning sheave attached to the piston in the rodless cylinder for effecting tension on the rope threaded across the freely rotating sheave and around the tensioning sheave.

Yet another object of the invention is to provide a new and improved rodless cylinder rope tensioning apparatus which is characterized in a most preferred embodiment by a pair of rodless cylinders, each fitted with a rope tensioning sheave on a corresponding piston thereof and mounted in substantially parallel relationship with guide rollers provided substantially in alignment with the rope tensioning sheaves, respectively, to guide the ropes over the respective guide sheaves and rope tensioning sheaves and facilitate selective tensioning in each of the ropes by operation of the respective rodless cylinders.

SUMMARY OF THE INVENTION

These and other objects of the invention are provided in a new and improved rodless cylinder rope tensioning apparatus which includes at least one rodless cylinder, the internal piston of which is fitted with a rope tensioning sheave aligned with a guide sheave which freely rotates with respect to the rope tensioning sheave, wherein one or more ropes may be extended over one or a pair of the guide sheave or sheaves and the rope tensioning sheave or sheaves for tensioning by operation of the respective rodless cylinder pistons responsive to operation of a preferred pneumatic control system designed for the purpose. Typical pneumatic controls include an adjustable pressure regulator with automatic water drain for receiving line or system air; an adjustable safety regulator that receives air from the adjustable pressure regulator with automatic water drain; a two position three-way lever valve which also receives line air pressure and operates a two-position, three-way air piloted valve, as well as an adjustable pressure regulator; a three-position, two-way lever valve for receiving air pressure from the adjustable pressure regulator with automatic water drain; a three-position five-way double air piloted valve for controlling various OR valves; quick exhaust vents; air piloted check valves; adjustable flow controls; and ultimately, rodless cylinder itself.

BRIEF DESCRIPTION OF THE DRAWINGS

The invention will be better understood by reference to the accompanying drawings, wherein.

DESCRIPTION OF THE PREFERRED EMBODIMENTS

Figure 15:
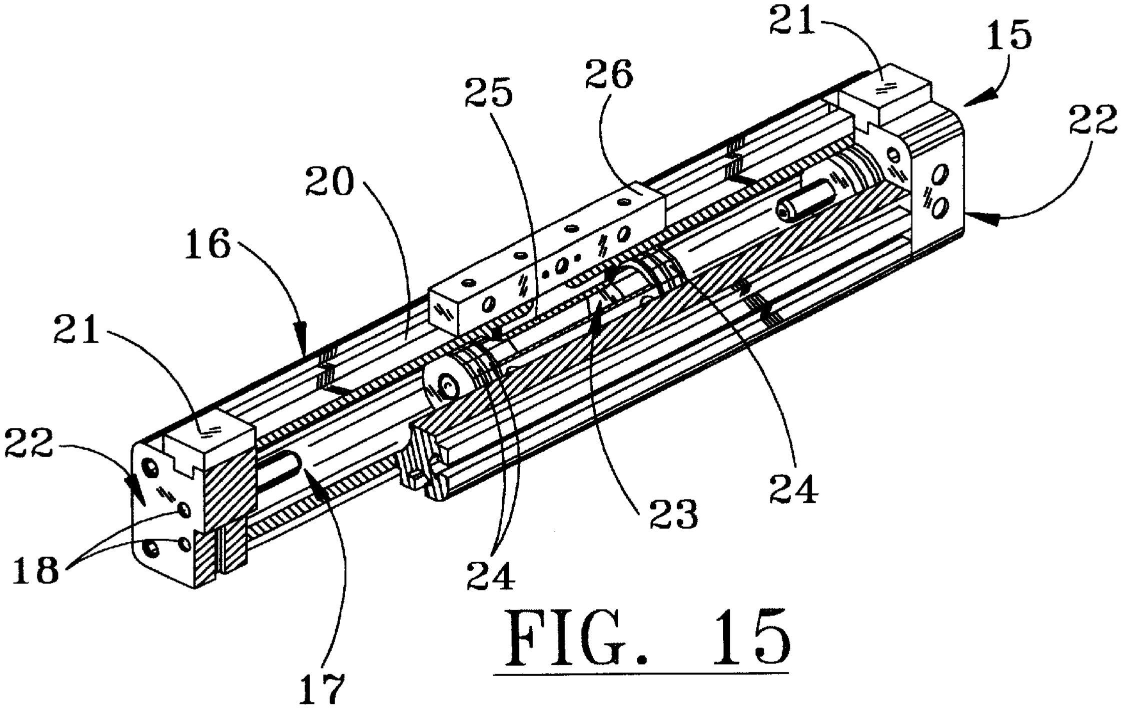
FIG. 15 is a perspective view, partially in section, of the rodless cylinder illustrated in FIG. 14, more particularly illustrating an internal piston attached to the external piston yoke of the rodless cylinder.

Referring initially to FIGS. 1–7 and 13–15 of the drawings, in a most preferred embodiment the rodless cylinder rope tensioning apparatus of this invention is generally illustrated by reference numeral 38. The rodless cylinder rope tensioning apparatus 38 is characterized in a first preferred embodiment by a rodless cylinder 15, having an elongated barrel 16 with a barrel bore 17, as illustrated in FIG. 15. Air supply ports 18 are provided in each of the end caps 22 of the barrel 16 and communicate with the barrel bore 17, as further illustrated in FIGS. 13 and 15. A barrel slot 20 is provided longitudinally in the barrel 16 and communicates with the barrel bore 17 for slidably receiving a piston yoke 26, which is attached to an internal piston 23, positioned in the barrel bore 17 by means of a connecting plate 25, as further illustrated in FIG. 15. Piston seals 24 are fitted to the ends of the piston 23 for sealing the piston 23 in slidable relationship inside the barrel bore 17 of the barrel 16 and the end caps 22 close each end of the barrel 16, as further illustrated in FIG. 14. Referring again to FIG. 15, a pair of end cushions 21 are also provided in the barrel bore 17 at each end of the barrel 16 to cushion movement of the piston 23 inside the barrel bore 17 with an accompanying sliding movement of the external piston yoke 26, as hereinafter further described.

Figure 1:
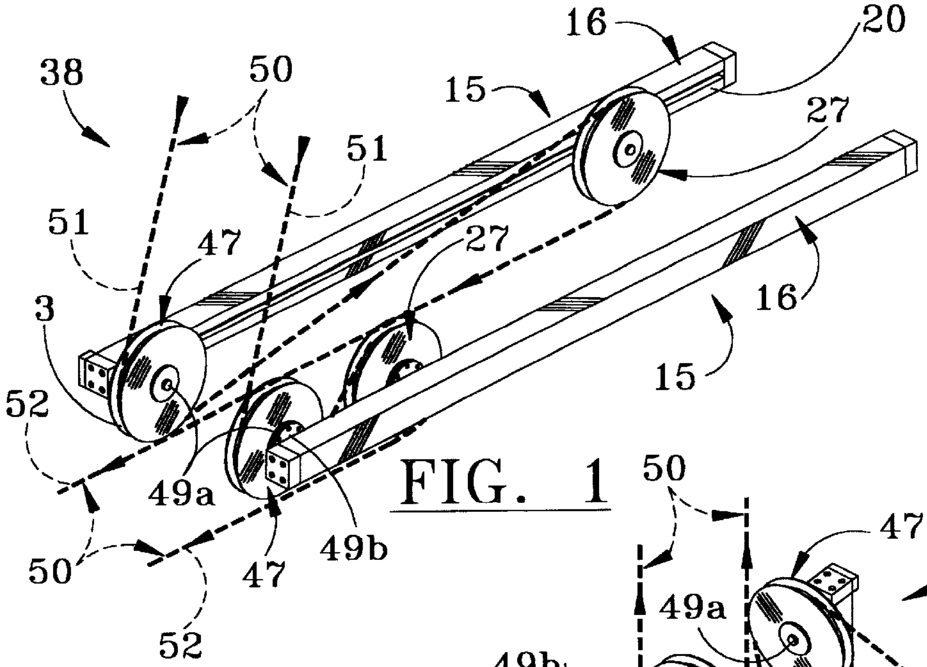
FIG. 1 is a perspective view of a first preferred embodiment of the rodless cylinder rope tensioning apparatus horizontally-mounted and including a pair of rodless cylinders, cooperating sliding yoke sheaves and companion entry guide rollers for use in a paper-making apparatus and tensioning one or more ropes in the apparatus.
Figure 2:
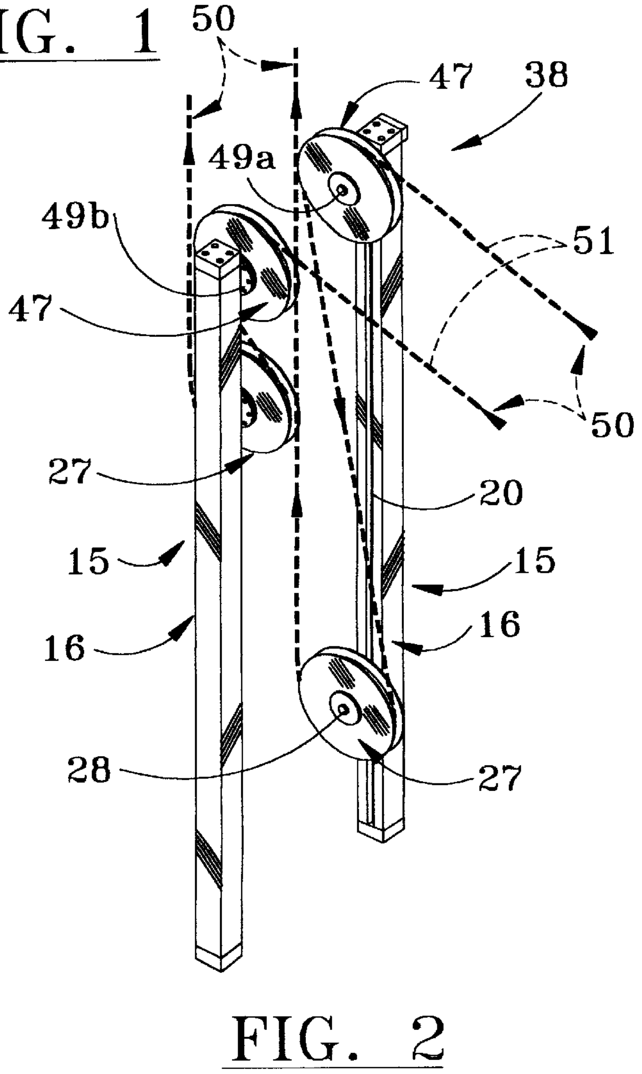
FIG. 2 is a perspective view of the rodless cylinder rope tensioning apparatus illustrated in FIG. 1, with the rodless cylinders oriented vertically, rather than horizontally.

As further illustrated in FIGS. 1, 2 and 8–10, it will be appreciated by those skilled in the art that one or more of the rodless cylinders 15, which are the primary operating components of the rodless cylinder rope tensioning apparatus 38, may be horizontally (FIG. 1) or vertically (FIG. 2) oriented, to receive one or more ropes 50, which are conventionally used in a paper-making machine (not illustrated) to carry a paper web (also not illustrated) in the paper-making process. Accordingly, at least one entry guide roller 47 is typically attached to corresponding rodless cylinder 15 by means of a roller shaft 49*a* and shaft bracket 49*b* to receive the respective rope(s) 50. Furthermore, a yoke sheave 27 is mounted on a corresponding sheave shaft 28, illustrated in FIGS. 8–10 and the sheave shaft bearing 29 carrying the sheave shaft 28 is fitted with a yoke slot 30, for engaging and mounting on the corresponding piston yoke 26, which is slidably mounted on the rodless cylinder 15 as heretofore described. Each of the yoke sheaves 27 can therefore slide with the corresponding piston yoke 26 along the length of the rodless cylinder 15 at the barrel slot 20, for purposes which will be hereinafter described. Furthermore, the entry rope segment 51 of the rope or ropes 50 extends around the entry guide roller or rollers 47 as heretofore described and 180 degrees around the corresponding yoke sheave 27, to exit the rodless cylinder rope tensioning apparatus 38 as an exit rope segment 52, as further illustrated in FIGS. 1 and 2. It will be appreciated by those skilled in the art that under circumstances where a single rope 50 is utilized in the specific paper-making apparatus in question, a single rodless cylinder 15 with an accompanying entry guide roller 47 and a corresponding slidably-mounted yoke sheave 27 may be utilized to tension the rope 50, in either the horizontal configuration illustrated in FIG. 1 or the vertical position illustrated in FIG. 2. Alternatively, under circumstances where a pair of ropes 50 are utilized in the paper-making apparatus the ropes 50 may be threaded as indicated in FIGS. 1 and 2 around the respective pairs of entry guide rollers 47 and corresponding yoke sheaves 27 for tensioning purposes as hereinafter further described.

Figure 4:
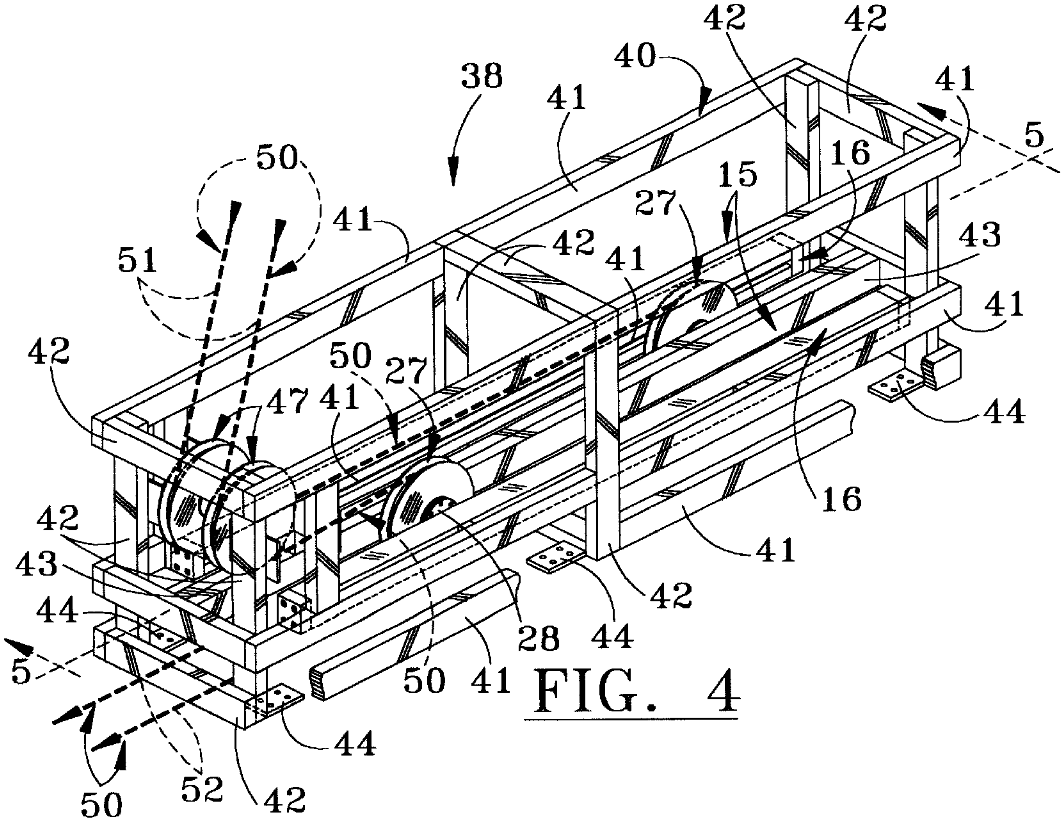
FIG. 4 is a perspective view of a preferred embodiment of the rodless cylinder rope tensioning apparatus illustrated in FIGS. 1 and 2, more particularly illustrating a frame for receiving and mounting each of the rodless cylinders, as well as the entry guide rollers.
Figure 5:
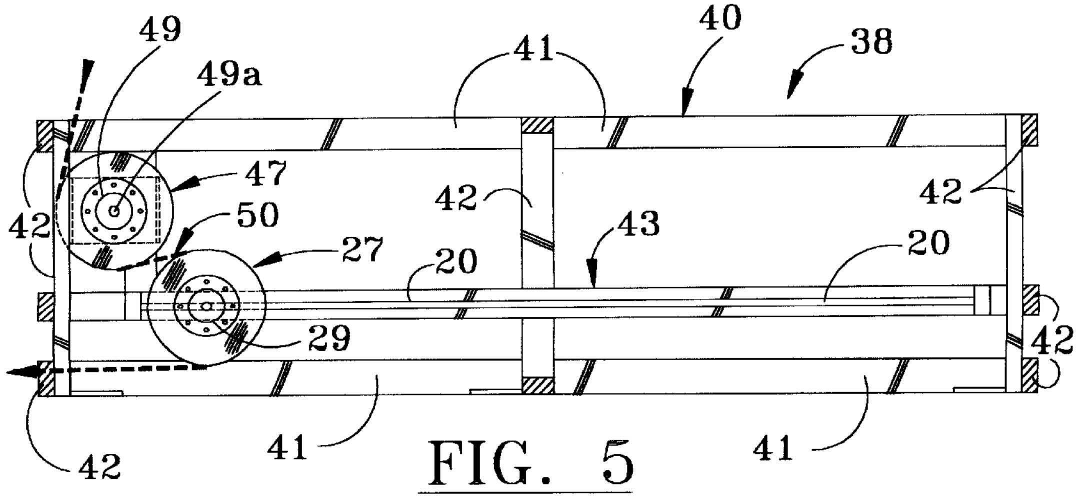
FIG. 5 is a sectional view taken along line 5—5 of the rodless cylinder rope tensioning apparatus illustrated in FIG. 4.
Figure 6:
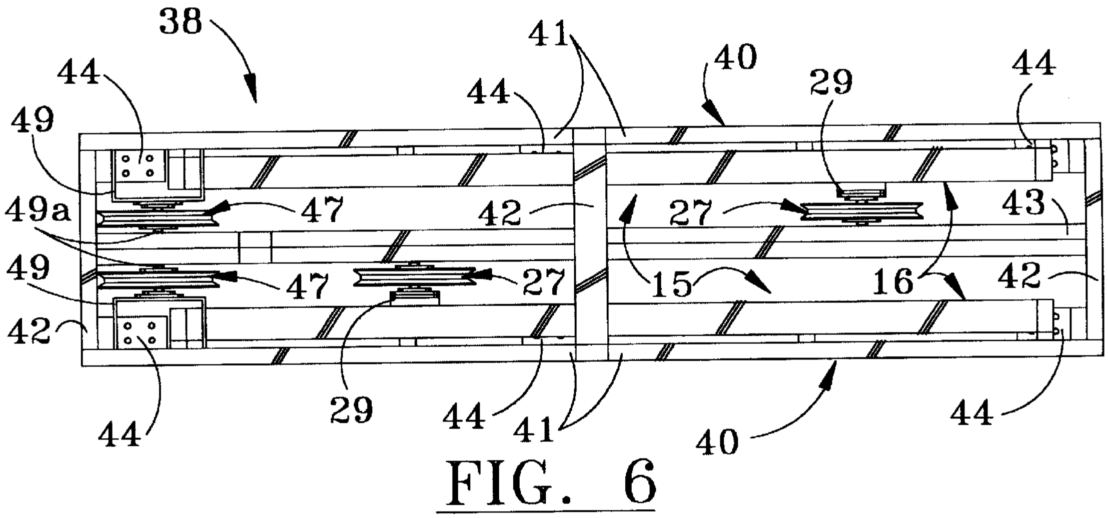
FIG. 6 is a bottom view of the rodless cylinder rope tensioning apparatus illustrated in FIG. 4.
Figure 7:
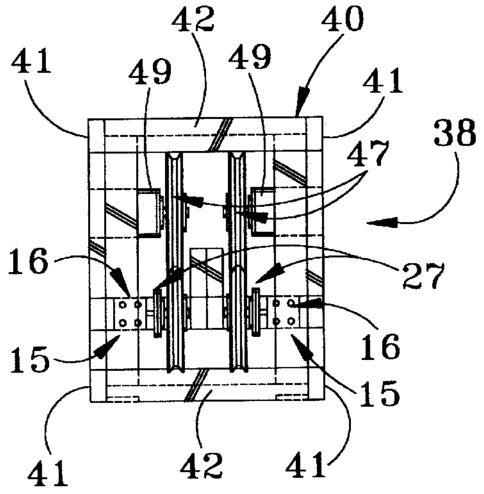
FIG. 7 is an end view of the rodless cylinder rope tensioning apparatus illustrated in FIGS. 4–6.
Figure 8:
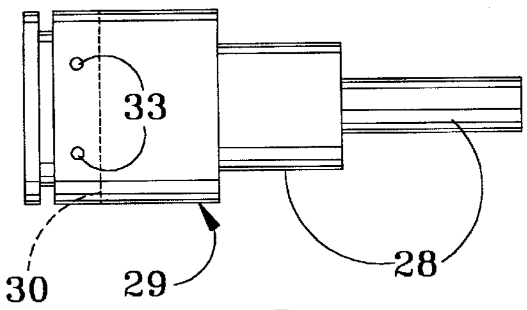
FIG. 8 is a side view of a typical sheave shaft bearing for mounting on the piston yoke of a rodless cylinder and receiving a yoke sheave.
Figure 9:
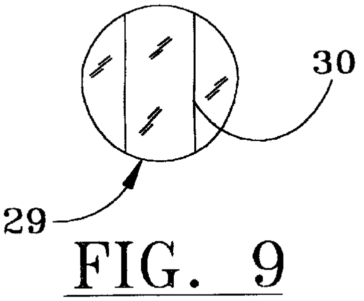
FIG. 9 is a bearing end view of the sheave shaft bearing illustrated in FIG. 8.
Figure 10:
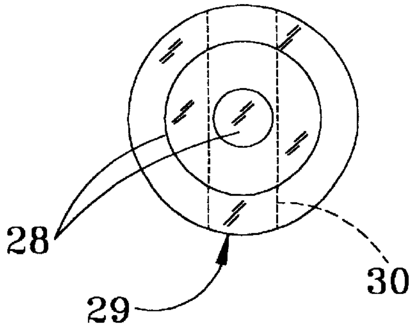
FIG. 10 is a shaft end view of the sheave shaft bearing illustrated in FIG. 8.
Figure 11:
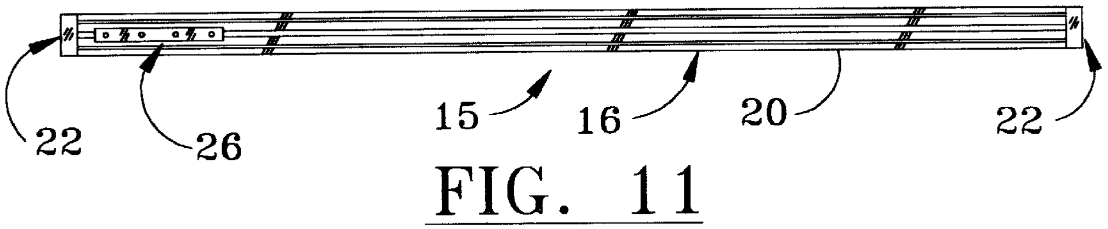
FIG. 11 is a top view of a typical rodless cylinder fitted with a piston yoke for receiving the sheave shaft bearing illustrated in FIG. 8 and the yoke sheave illustrated in FIG. 3.
Figure 12:
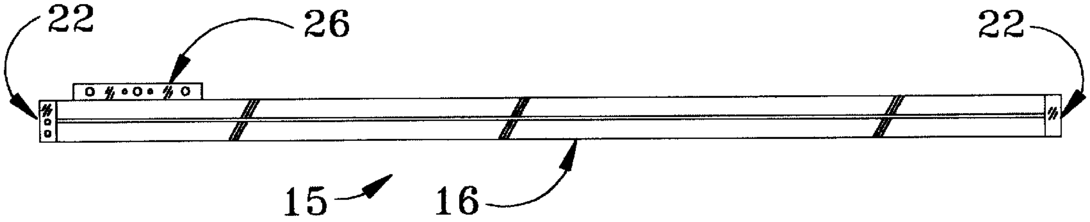
FIG. 12 is a side view of the rodless cylinder illustrated in FIG. 11.
Figure 13:
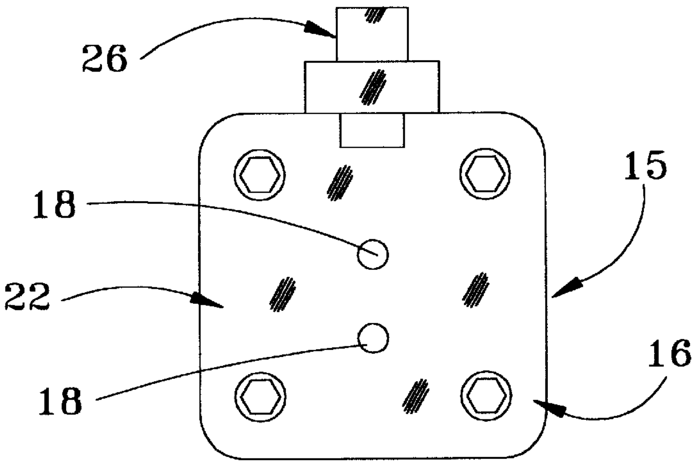
FIG. 13 is an end view of the rodless cylinder illustrated in FIGS. 11 and 12.
Figure 14:
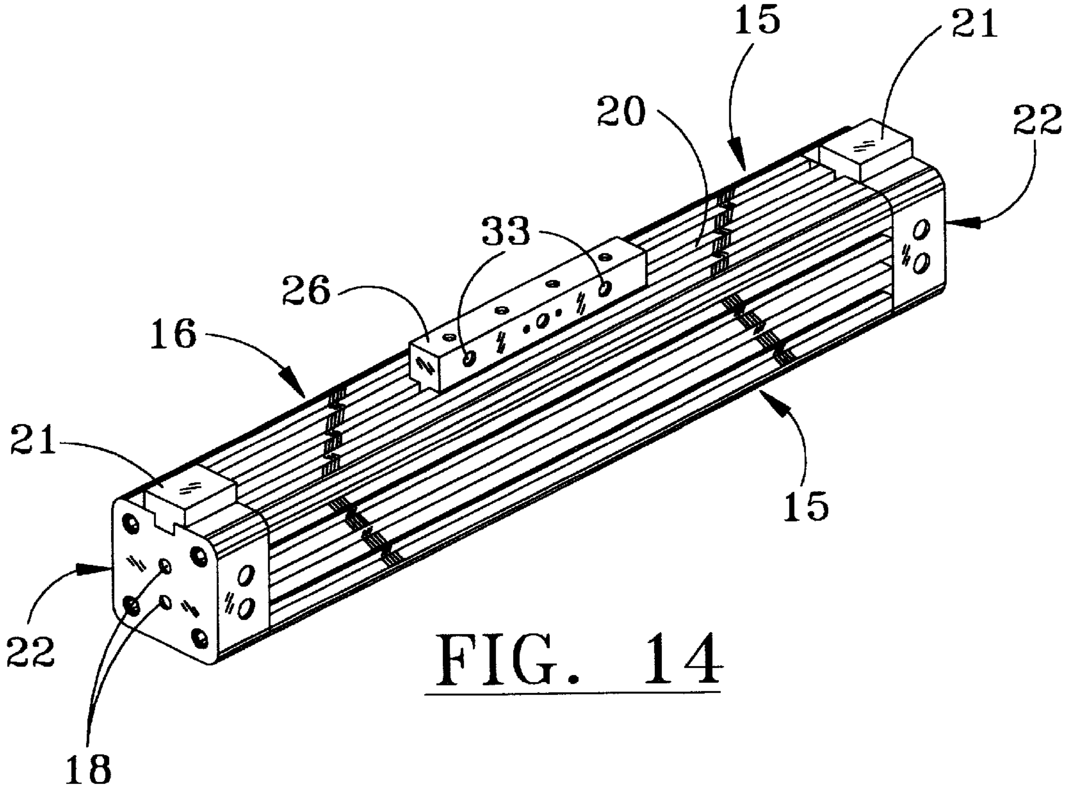
FIG. 14 is a perspective view of the rodless cylinder illustrated in FIGS. 11–13.

Referring now to FIGS. 4–7 of the drawings, in a most preferred embodiment of the invention the respective rodless cylinders 15 are installed and mounted in a frame 40, constructed of longitudinal frame members 41, cross frame members 42 and a central longitudinal stiffener 43. Mount brackets 44 are also provided on the frame 40 for mounting the frame 40 in a vertical or horizontal position in the rope tensioning apparatus, as deemed necessary. Furthermore, roller bearings 49 may be provided on the frame 40 for receiving respective entry guide rollers 47 under circumstances where the entry guide rollers 47 are mounted to the frame 40 and not to the respective rodless cylinders 15, as illustrated in FIGS. 1 and 2. The rodless cylinder rope tensioning apparatus 38 illustrated in FIG. 4 thus operates in the same manner as the corresponding rodless cylinder rope tensioning apparatus 38 illustrated in FIGS. 1 and 2, either in horizontal or vertical position, wherein the respective ropes 50 are extended through the entry guide rollers 47 as entry rope segments 51 and project from the corresponding yoke sheaves 27 as exit ropes segments 52, as illustrated in FIG. 4. The entry guide rollers 47 are conventional and may be provided with the rodless cylinder rope tensioning apparatus 38 or may be separately provided, as required.

Figure 3:
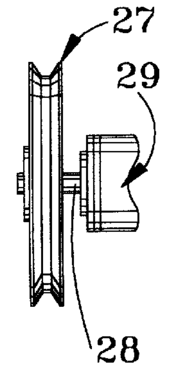
FIG. 3 is a side view of a typical sliding yoke sheave, more particularly illustrating rotatable mounting of the yoke sheave on a sheave shaft in a sheave shaft bearing.

Referring again to FIGS. 3 and 8–10 in a most preferred embodiment of the invention the respective yoke sheaves 27 are mounted on the corresponding piston yokes 26 of the rodless cylinders 15 by means of the respective sheave shafts 28, journalled for rotation in the sheave shaft bearings 29. In this installation, the yoke slot 30 of each of the sheave shaft bearings 29 is fitted over the corresponding piston yoke 26, slidably mounted on each rodless cylinder 15, and fasteners such as bolts (not illustrated) are extended through the matching bolt openings 33 provided in the sheave shaft bearings 29 and the piston yoke 26 to receive corresponding bolts (not illustrated) in the installations. Each of the yoke sheaves 27 are shaped as illustrated in FIG. 3 to accommodate the rope 50.

Figure 16:
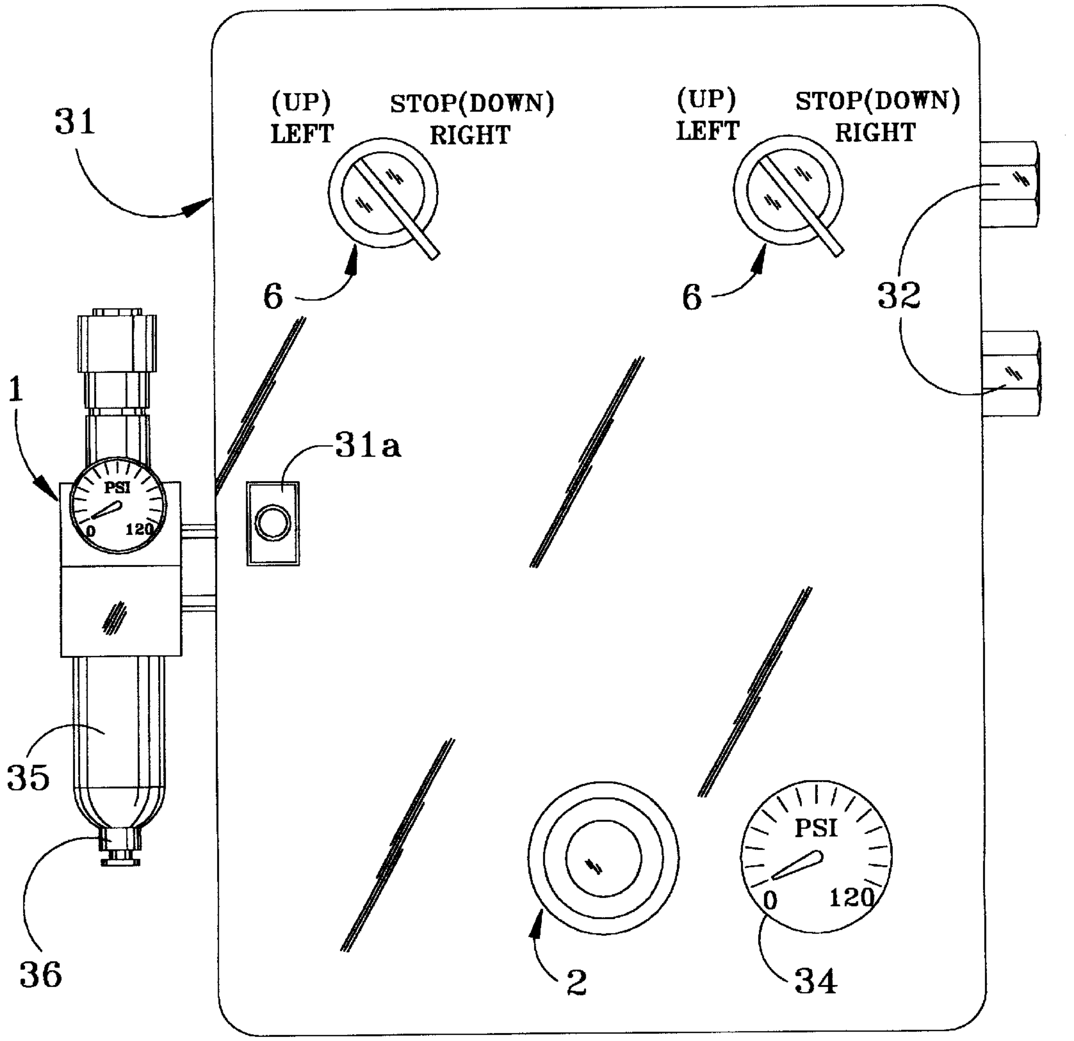
FIG. 16 is a front view of a typical control cabinet used to operate the rodless cylinder rope tensioning apparatus of this invention.
Figure 17:
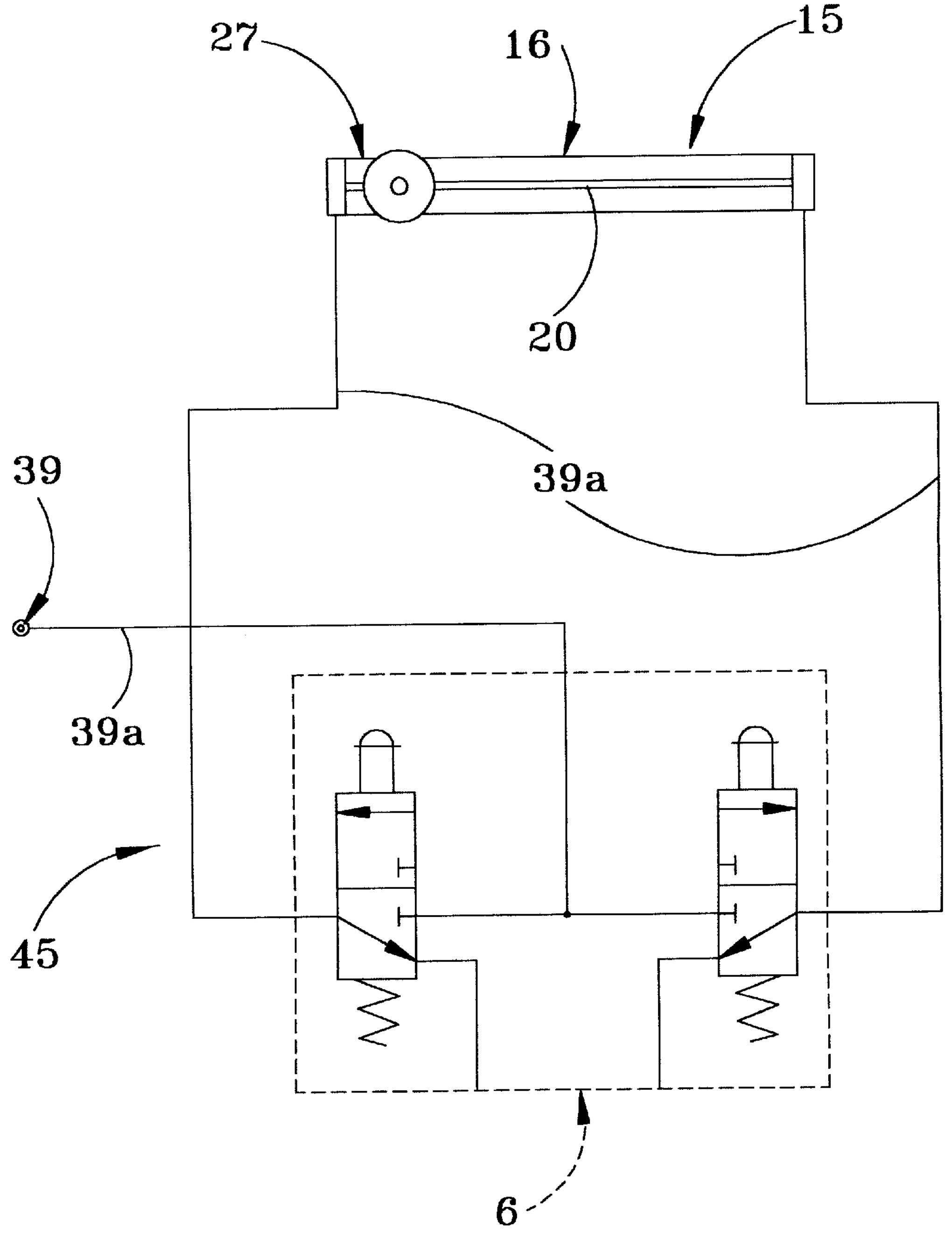
FIG. 17 is pneumatic schematic illustrating preferred components for operating the rodless cylinder rope tensioning apparatus under a simplified embodiment of the invention.
Figure 18:
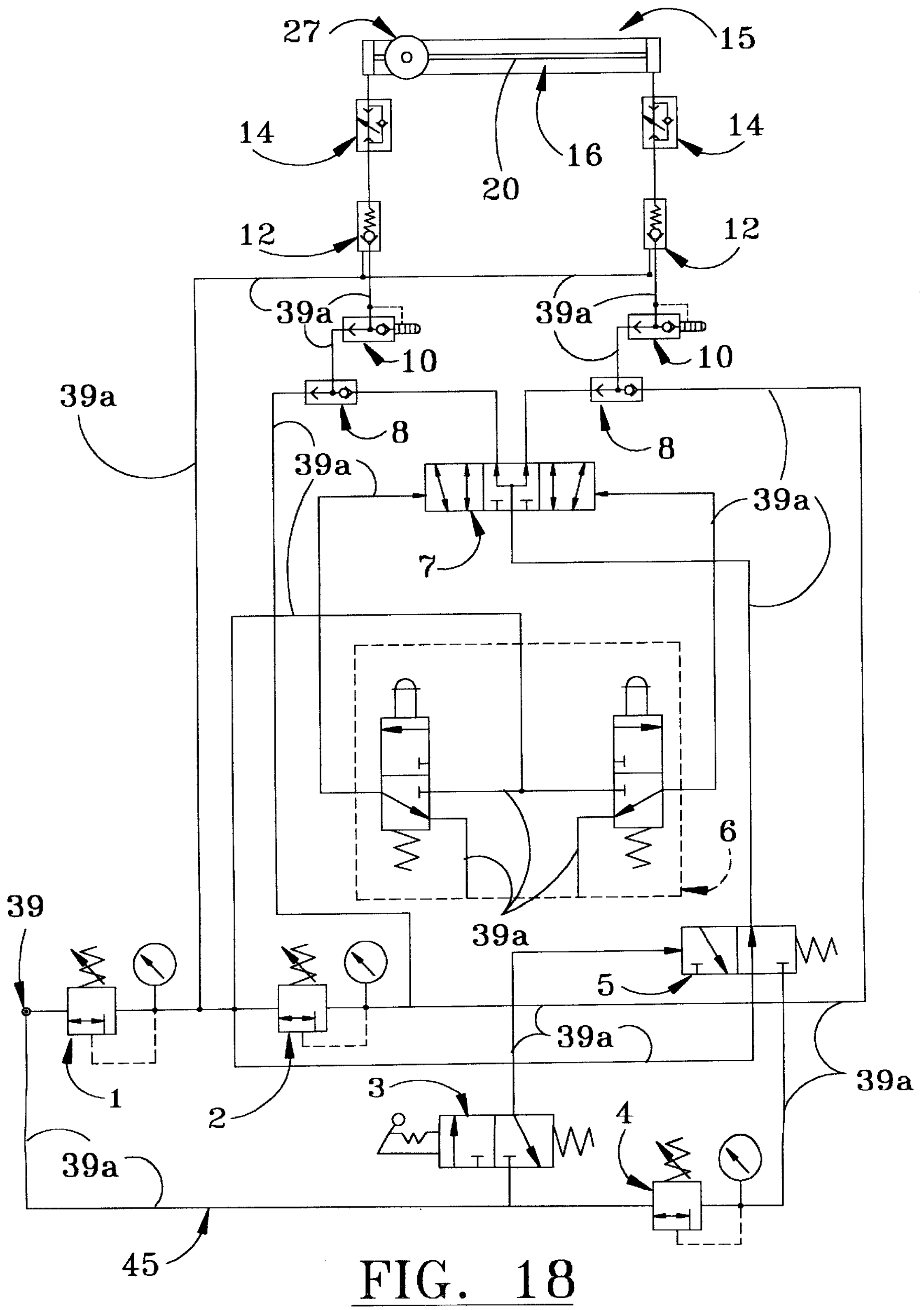
FIG. 18 is a pneumatic schematic illustrating operating components for operating the rodless cylinder rope tensioning apparatus of this invention in a most preferred embodiment.

Referring now to FIGS. 16–18 of the drawings, the rodless cylinder rope tensioning apparatus 38 is operated by means of a pneumatic control system 45 which, in preferred embodiments is illustrated schematically in FIGS. 17 and 18. In the control system embodiment illustrated in FIG. 17, air pressure from an air source 39 is applied to a three-position, two-way lever valve 6 which is connected to both ends of a rodless cylinder 15 through the air supply ports 18, illustrated in FIGS. 13 and 14. The three-position, two-way lever valve 6 is designed to facilitate threading of the rope or ropes 50 onto the entry guide roller or rollers 47 and the corresponding yoke sheave or sheaves 27 and has three positions, "left, "stop" and "right" or "up, "stop" and "down", depending upon the mounting position of the rodless cylinder 15. Accordingly, if the rodless cylinder 15 is mounted horizontally, as illustrated in FIGS. 1 and 4 of the drawings, the three-position, two-way lever valve 6 will be operated in the "left, "stop" and "right" positions. Alternatively, if the rodless cylinder 15 is vertically oriented as illustrated in FIG. 2, the appropriate operating label will read "up", "stop" and "down". As illustrated in FIG. 16, the appropriate controls for the three-position two-way lever valve 6 may be mounted in a control cabinet 31, having air line coupling 32 for coupling to the air lines 39*a*, illustrated in FIGS. 17 and 18, and including a cabinet lock 31*a*. A pressure gauge 34 may also be provided on the control cabinet 31 to indicate the pressure of the air source 39.

In operation, and referring again to FIG. 17 of the drawings, the rodless cylinder 15 is operated to move the yoke sheave 27 linearly along the barrel 16 and thread and tension the rope 50, as follows. For brevity, operation of the pneumatic control system 45 illustrated in FIG. 17 will be described with respect to a single rodless cylinder 15 and rope 50. Initially, referring to FIGS. 1, 4 and 16 the three-position, two-way lever valve 6 is manipulated to the "left" position to slidably adjust the yoke sheave 27 to the end of the corresponding rodless cylinder 15 that will allow for maximum stroke, which will be to the left, nearest the entry guide roller 47, as illustrated in FIGS. 1 and 4. The three-position, two-way lever valve 6 is then manipulated into the "stop" position and the rope 50 is threaded around the entry guide roller 47 and 180 degrees onto the yoke sheave 27 and then spliced to define a continuous loop, in conventional fashion. The three-position, two-way lever valve 6 is then gradually manipulated into the "right" position, until the excess slack is removed from the rope 50 and the three-position, two-way lever valve 6 is left in this "run" position during running of the rope 50 through the paper-making machine (not illustrated) and the yoke sheave 27, as well as the corresponding entry guide roller 47 in the apparatus.

Referring now to FIGS. 16 and 18 of the drawings, the illustrated pneumatic control system 45 is designed to include additional equipment that provides alternatives to operation and several safety features for protecting the rodless cylinder 15 and operating system during operation of the rodless cylinder rope tensioning apparatus 38.

Accordingly, the pneumatic control system 45 illustrated in the schematic of FIG. 18 includes an adjustable pressure regulator with automatic water drain 1, illustrated in FIGS. 16 and 18, as well as an adjustable safety regulator 2, pneumatically coupled to the adjustable pressure regulator with automatic water drain 1 by means of an air line 39*a* and designed to maintain pressure in the "dead", or non-operating side of the rodless cylinder 15. As further illustrated in FIG. 16, the adjustable pressure regulator with automatic water drain 1 further includes a pressure gauge 34, water sump 35, and sump drain 36 for removing water from the air applied to the adjustable pressure regulator with automatic water drain from the air source 39. A two-position, three-way lever valve 3, which controls "run" and "thread" system operation, is also pneumatically coupled by means of an air line 39*a* to the air source 39 and to an adjustable pressure regulator 4, which regulates the "run" air pressure in the system. A two-position, three-way air piloted valve 5 is pneumatically coupled to the adjustable pressure regulator 4 and to the two-position, three-way lever valve 3, also by means of air lines 39*a*, for directing air from the adjustable pressure regulator 4 to the rodless cylinder 15. The three-position, two-way lever valve 6 facilitates threading of a rope 50 and is pneumatically coupled by means of an air line 39*a* to the connecting air line 39*a* between the adjustable pressure regulator with automatic water drain 1 and the adjustable safety regulator 2 and also to a three-position, five-way double air piloted valve 7. The three-position, five-way double air piloted valve 7 is pneumatically connected by an air line 39*a* to the two-position, three-way air piloted valve 5 and serves to initially control the threading and running of a rope 50 on a corresponding entry guide roller 47 and yoke sheave 27 of the rodless cylinder rope tensioning apparatus 38. A pair of OR valves 8 are also pneumatically connected to the three-position, five-way double air piloted valve 7 and to each other, as well as to a pair of quick exhaust vents 10, all by means of air lines 39*a*, for directing air pressure from the three-position, five-way double air piloted valve 7 or the adjustable safety regulator 2, as further illustrated in FIG. 18. The quick exhaust vents 10 are, in turn, pneumatically connected by means of air lines 39*a* to a pair of air piloted check valves 12 and the OR valves 8, to facilitate exhausting of air from each end of the rodless cylinder 15 when the piston 23 moves in the barrel bore 17, illustrated in FIG. 15. Adjustable flow controls 14, that connect to each end of the rodless cylinder 15 and the air piloted check valves 12 for operational purposes, serve to control the flow of air to each end of the rodless cylinder 15, as further illustrated in FIG. 18.

Accordingly, in operation, the yoke sheave 27 is initially slidably adjusted in the rodless cylinder 15 to the point of minimum rope stretch, as heretofore described with respect to the pneumatic control system 45 illustrated in FIG. 17. The three-position, two-way lever valve 6 is utilized for this purpose and is initially positioned in the left-hand position to accomplish this purpose. The rope 50 is then extended through the respective entry guide roller 47 and 180 degrees around the corresponding yoke sheave 27 and spliced, taking out maximum slack in the splicing operation. After splicing is completed and the rope 50 is in the proper position in the paper-making machine (not illustrated) and in the rodless cylinder rope tensioning apparatus 38, the three-position, two-way air lever valve 6 is then gradually shifted into the right-hand position to remove the balance of the slack and is left in this position during the "run" configuration of the rope 50 to tension the rope 50. The three-position, two-way lever valve 6 is designed to operate under a preset air pressure regulated by the adjustable pressure regulator 4, for proper operation of the rope 50 in the "run" configuration. Although the rope 50 is now in the "run" configuration, additional tension must normally be placed on the rope 50 in order to begin threading the paper web (not illustrated) through the paper machine on the rope 50. Accordingly, the two-position, three-way lever valve 3 is manipulated from the "run" position to increase the rope tension to the "thread" position and the air pressure for the "thread" configuration is controlled by the adjustable pressure regulator with automatic water drain 1. Accordingly, the rope 50 is now operating at maximum tension in the "thread" position to facilitate loading of a paper web (not illustrated) on the rope 50 and threading the paper web through the paper machine (not illustrated) in conventional fashion.

Air from the three-position, two-way lever valve 6 is channelled through the three-position, five-way double air piloted valve 7 to either of the OR valves 8 and the respective quick exhaust vents 10, the air piloted check valves 12, adjustable flow controls 14 and into the respective ends of the rodless cylinder 15.

It will be appreciated by those skilled in the art that the components of the pneumatic control system 45 that are designed to protect the rodless cylinder 15 and other components of the system from inadvertent damage should the rope 50 suddenly break, air pressure be lost, or a like malfunction, are as follows: the adjustable pressure regulator with automatic water drain 1, the adjustable safety regulator 2, the air piloted check valves 12 and the adjustable flow controls 14.

It will be appreciated by those skilled in the art that the above explanation of the operation of the pneumatic control system 45 is directed to the single rope 50 threaded through a single entry guide roller 47 and corresponding yoke sheave 27. However, in many operations, two such rodless cylinder rope tensioning apparatus 38 will be necessary, thus necessitating a second pneumatic control system 45 which is identical to the pneumatic control system 45 illustrated in FIG. 17. Hence, referring to FIG. 16, a pair of three-position, two-way lever valves 6 are illustrated for the purpose and all of the other components illustrated in FIG. 18 are duplicated, with the exception of the adjustable pressure regulator with automatic water drain 1.

While the preferred embodiments of the invention have been described above, it will be recognized and understood that various modifications may be made in the invention and the appended claims are intended to cover all such modifications which may fall within the scope and spirit of the invention.

Having described my invention with the particularity set forth above,

What is claimed is:

1. A rodless-cylinder rope tensioning apparatus comprising a rodless cylinder for tensioning a rope, said rodless cylinder comprising a barrel having a barrel bore and a barrel slot provided in said barrel; an internal piston slidably disposed in said barrel bore for traversing said barrel; a first valve operably connected to said barrel for selectively causing said internal piston to traverse said barrel and a yoke sheave connected to said internal piston through said barrel slot for receiving the rope and adjusting the tension on the rope responsive to operation of said first valve.

2. The rodless cylinder rope tensioning apparatus of claim 1 comprising a second rodless cylinder for tensioning a second rope, said second rodless cylinder comprising a second barrel having a second barrel bore and a second barrel slot provided in said second barrel, said second barrel positioned in substantially parellel, adjacent relationship to said first barrel of said first rodless cylinder; a second internal piston slidably disposed in said second barrel bore for traversing said second barrel; a second valve operably connected to said second barrel for selectively causing said second internal piston to traverse said second barrel; and a second yoke sheave connected to said second internal piston through said second barrel slot for receiving the second rope and adjusting tension on the second rope responsive to operation of said second valve.

3. The rodless cylinder rope tensioning apparatus of claim 2 comprising a frame for receiving said first and said second rodless cylinders in substantially parallel, spaced-apart relationship.

4. The rodless cylinder rope tensioning apparatus of claim 1 comprising at least one guide roller provided in substantial alignment with said yoke sheave for receiving the rope and aligning the rope with said yoke sheave.

5. The rodless cylinder rope tensioning apparatus of claim 1 comprising an adjustable safety regulator operably connected in fluid communication to said rodless cylinder and said first valve for applying air pressure to said rodless cylinder.

6. The rodless cylinder rope tensioning apparatus of claim 1 comprising:

(a) at least one guide roller provided in substantial alignment with said yoke sheave for receiving the rope and aligning the rope with said yoke sheave; and (b) an adjustable safety regulator operably connected in fluid communication to said rodless cylinder and said first valve means for applying air pressure to said rodless cylinder.

7. The rodless cylinder rope tensioning apparatus of claim 6 comprising a second rodless cylinder for tensioning a second rope, said second rodless cylinder comprising a second barrel having a second barrel bore and a second barrel slot provided in said second barrel, said second barrel positioned in substantially parallel, adjacent relationship to said first barrel of said first rodless cylinder; a second internal piston slidably disposed in said second barrel bore for traversing said second barrel; a second valve operably connected to said second barrel for selectively causing said second internal piston to traverse said second barrel; and a second yoke sheave connected to said second internal piston through said second barrel slot for receiving the second rope and adjusting tension on the second rope responsive to operation of said second valve.

8. The rodless cylinder rope tensioning apparatus of claim 7 comprising a frame for receiving said first and said second rodless cylinders in substantially parallel, spaced-apart relationship.

9. A rodless cylinder rope tensioning apparatus for tensioning at least one rope in a paper-making machine, said apparatus comprising at least one rodless cylinder comprising an elongated barrel having an internal bore and a barrel slot provided in said barrel; a piston slidably disposed in said internal bore; a yoke sheave rotatably carried by said piston through said barrel slot, said yoke sheave slidably disposed with said piston; and a first lever valve operably connected with said internal bore on each side of said piston in said rodless cylinder, whereby said piston is caused to selectively traverse said internal bore in either direction responsive to operation of said first lever valve and selectively tension the rope.

10. The rodless cylinder rope tensioning apparatus of claim 9 comprising a second lever valve operably connected with said internal bore of said barrel, for selectively exerting additional tension on the rope.

11. The rodless cylinder rope tensioning apparatus of claim 9 comprising an adjustable safety regulator operably connected in fluid communication to said rodless cylinder and said first valve for applying air pressure to said rodless cylinder.

12. The rodless cylinder rope tensioning apparatus of claim 9 comprising:

(a) a second lever valve operably connected with said internal bore of said barrel, for selectively exerting additional tension on the rope; and (b) safety means operably connected in fluid communication to said rodless cylinder and said first valve for applying air pressure to said rodless cylinder.

13. The rodless cylinder rope tensioning apparatus of claim 9 comprising at least one guide roller provided in substantial alignment with said yoke sheave for receiving the rope and aligning the rope with said yoke sheave.

14. The rodless cylinder rope tensioning apparatus of claim 13 comprising a second lever valve connected in fluid communication with said first lever valve and said internal bore of said rodless cylinder, for selectively exerting additional tension on the rope.

15. The rodless cylinder rope tensioning apparatus of claim 13 comprising safety means an adjustable safety regulator operably connected in fluid communication to said rodless cylinder and said first valve for applying air pressure to said rodless cylinder.

16. The rodless cylinder rope tensioning apparatus of claim 13 comprising:

(a) a second lever valve operably connected with said internal bore of said barrel, for selectively exerting additional tension on the rope; and (b) safety means operably connected in fluid communication to said rodless cylinder and said first valve for applying air pressure to said rodless cylinder.

* * * * *